May 13, 1930. F. M. McFALLS ET AL 1,758,123
MINIATURE INTERURBAN TRAIN
Filed May 21, 1927 3 Sheets-Sheet 1
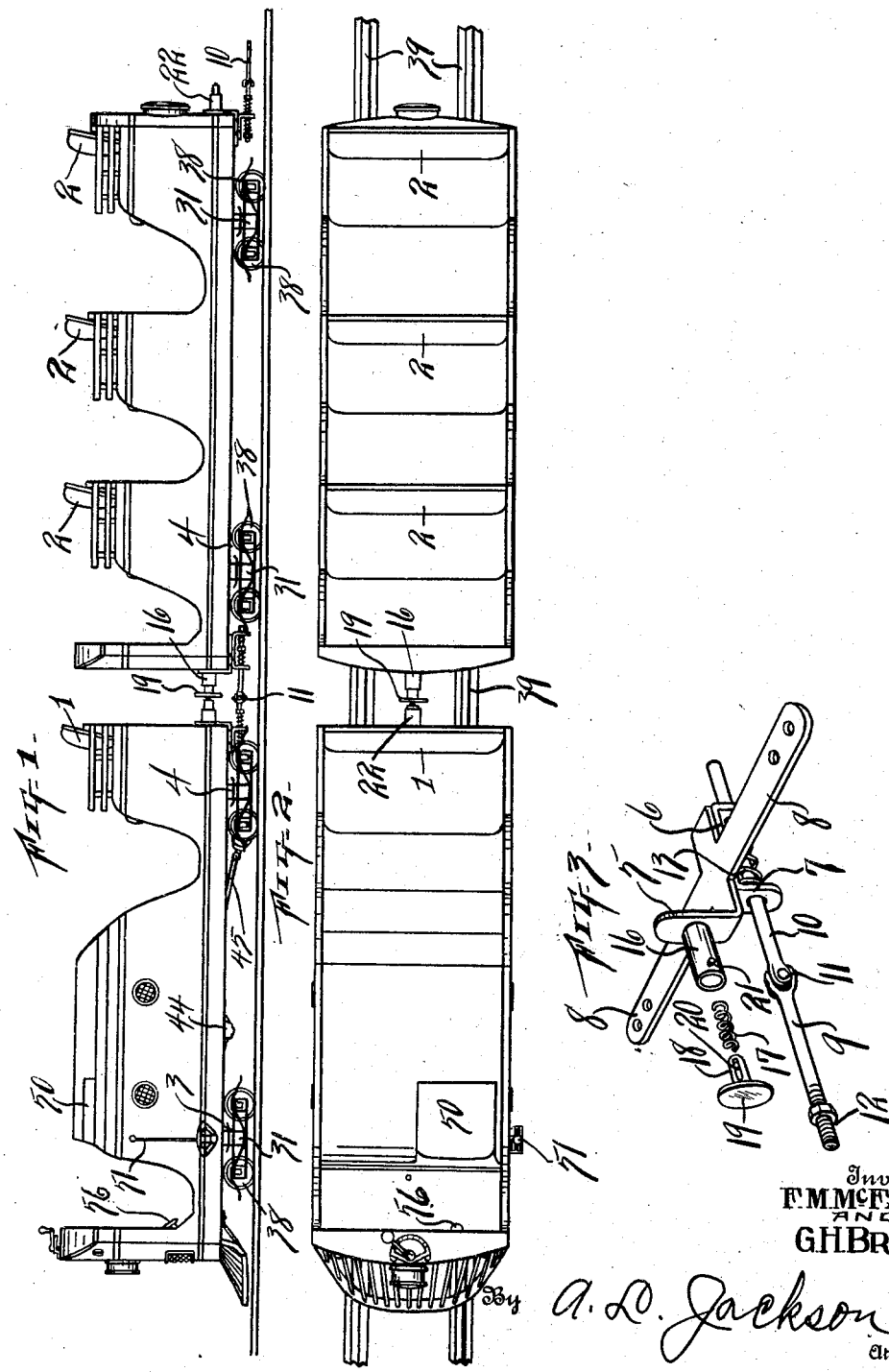
Inventors
F. M. McFALLS
AND
G. H. BROWN.
By A. D. Jackson
Attorney

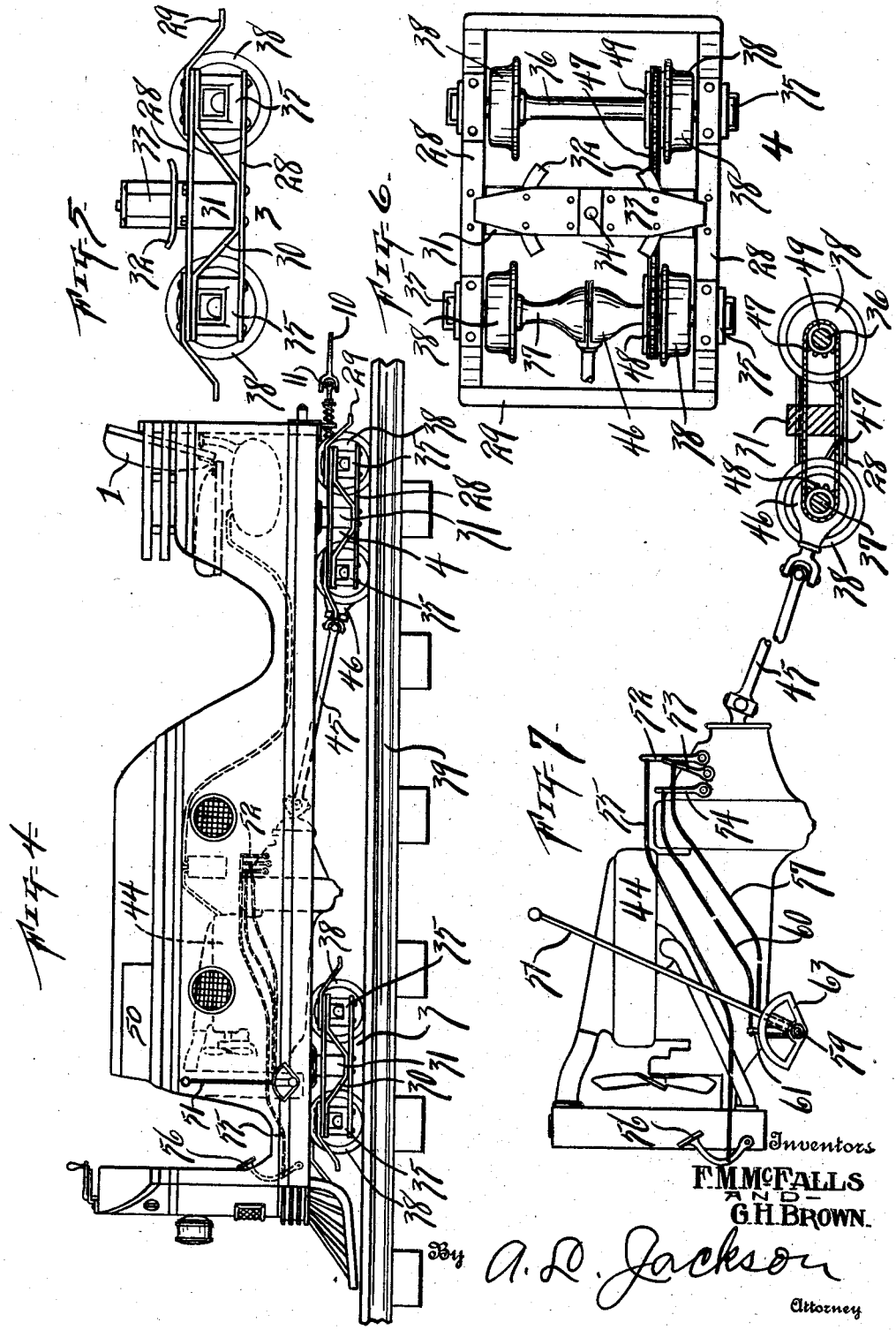

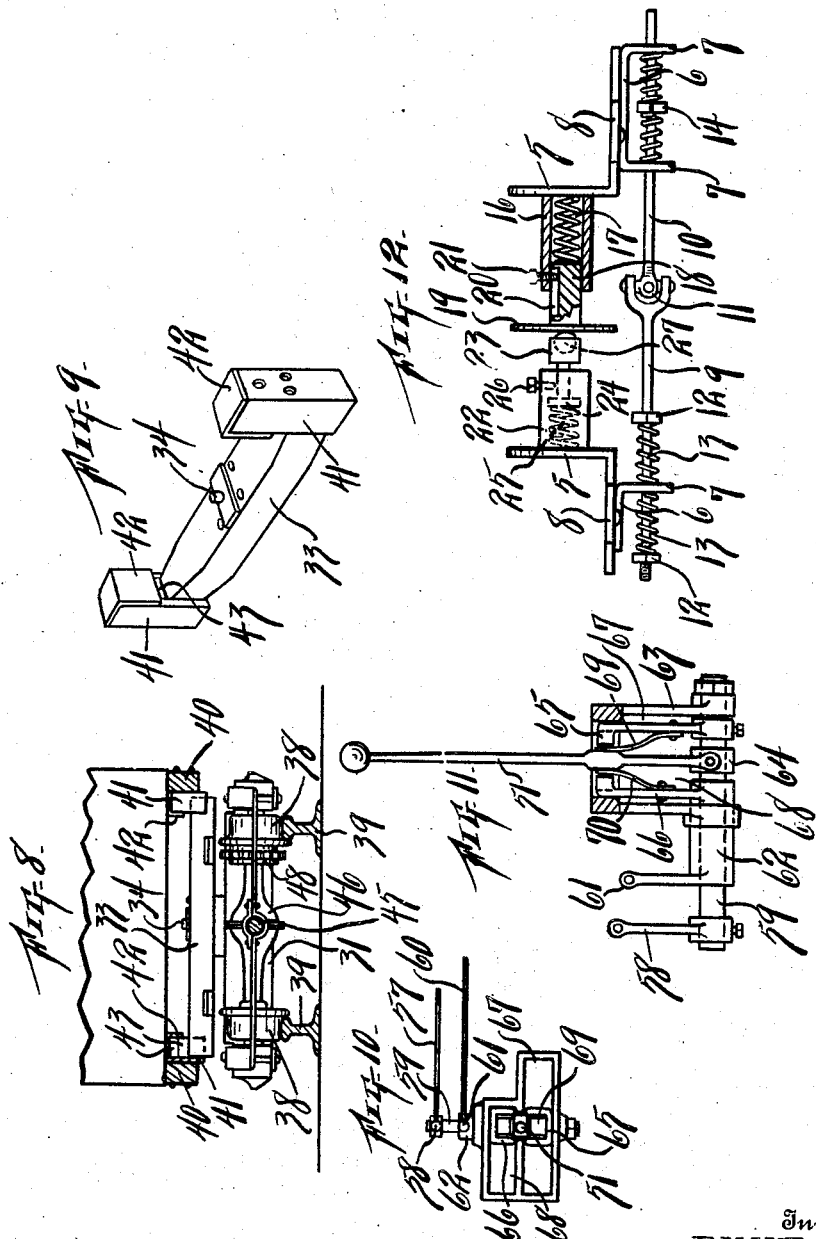

Patented May 13, 1930

1,758,123

UNITED STATES PATENT OFFICE

FRED M. McFALLS AND GEORGE H. BROWN, OF FORT WORTH, TEXAS

MINIATURE INTERURBAN TRAIN

Application filed May 21, 1927. Serial No. 193,130.

Our invention relates to miniature trains and more particularly of the type of interurban trains; and the object is to provide motor driven trains which are practical and feasible and which can be furnished at reasonable cost and which are highly efficient for pleasure and amusement purposes in parks and pleasure resorts and the like. The advantages of such trains is that they are easily operated and will carry a number of people and can be made to run up and down elevations similar to tracks on which gravity cars are operated. Other objects and advantages will be fully explained in the following description and the invention will be more particularly pointed out in the claims.

Reference is had to the accompanying drawings which form a part of this application.

Fig. 1 is a side elevation of a miniature train, one trailer being shown.

Fig. 2 is a plan view of the same.

Fig. 3 is a perspective view of the coupling devices.

Fig. 4 is a side elevation of the motor car on a larger scale.

Fig. 5 is a side elevation of one of the coach trucks.

Fig. 6 is a plan view of the same.

Fig. 7 is a diagrammatic view of the driving mechanism.

Fig. 8 is a broken view, showing an elevation of the differential of the drive truck.

Fig. 9 is a perspective view of the top bolster of a truck.

Fig. 10 is a top plan view of the gear shifting mechanism.

Fig. 11 is a front elevation of the gear shifting mechanism.

Fig. 12 is a detail view of the coupler and bumper between two trucks.

Similar characters of reference are used to indicate the same parts throughout the several views.

Our invention includes a motor car and as many trailers as may be required. The motor car has a seat 1 for the driver and each trailer has as many seats 2 as may be required. The motor car is provided with two four wheeled trucks 3 and 4. A trailer is connected to the motor car by a flexible connection. Bracing brackets 5 are attached to the end of a trailer or other car and to the adjacent bottom of the trailer or other car. Hanging brackets 6 are attached to the brackets 5 and are provided with depending hanging or bearing members 7. The brackets 5 have laterally extended arms 8 attached to the bottom of the car. Coupling rods 9 and 10 are connected by a universal joint 11. The rod 9 moves freely in the bearing 7 and the rod 10 moves freely in the bearing members 7 of the adjacent car. Stop nuts 12 are mounted on threaded portions of the rod 9 and springs 13 are mounted on the rod 9 and bear against the nuts 12 and against the bearing 7. A stop nut 14 is mounted on the rod 10 and springs 15 are mounted on the rod 10 and bear against the hanger bearings 7. The cars are thus connected together by yielding and flexible means.

Buffers are provided between each two cars. A tubular spring holder 16 is attached to the hanger bracket 5 and a spring 17 is mounted therein. A plunger 18 is mounted partly within the holder 16 and a disk 19 is rigid therewith. The plunger 18 has a slot 20 therein and a set screw 21 projects through the side of the holder into the slot 20. The set screw 21 will limit the travel of the plunger 18. A similar spring holder 22 is attached to the bracket 5 of the adjacent car. A plunger 23 moves in the holder 22 and a stop 24 is mounted thereon. The end of the plunger 23 constitutes another stop. A spring 25 is mounted in the holder 22. A set screw 26 projects through the side of the holder 22 and between the shoulder 24 and the end of plunger 23 for limiting the movement of the plunger 23. The end of the plunger 23 is cored out to form a cup shape. A ball bearing 27 is mounted in the end of the plunger 23 and bears against the disk 19. The mechanism thus described takes or absorbs the shock between the cars.

Each truck is composed of a quadrangular frame, having longitudinal members 28 and transverse or end members 29. The upper and lower parts of the members 28 are connected and braced by the bent bars 30 which are bolted thereto. The lower bolster member 31 is bolted to the side members 28 and provided with limited turn tables 32. The upper bolster member 33 is connected to the lower member 31 by a king-bolt 34. The upper bolster 33 turns on the king-bolt 34 and the turntable 32. Bearings 35 for the shafts 36 and 37 are carried by the bars 28 and 30. The trucks are provided with wheels 38 which run on tracks 39 of ordinary type. The bodies of the cars are mounted on the trucks by means of the side bars 40 and hangers 41 which are bolted to the frame members 40. The hangers 41 are of channel bar iron and the ends of the upper bolster members 33 project into the channels of the hangers 41. The hangers 41 are provided with caps or covers 42 welded to the hangers 41. The cars can be adjustably mounted on the hangers 41 by means of one or more blocks 43 placed on top of the ends of the upper bolsters 33 within the hangers 41 and held against displacement by the caps 42. The frame members 40 of the car bodies can go no lower than the blocks 43 will permit. These blocks may be larger or smaller as may be required.

The motor car is provided with a motor 44 of ordinary type. This motor drives the transmission shaft 45 which drives the differential gearing 46 which is of ordinary type. The differential gearing drives the shaft 37 and the shaft 36 is driven from the shaft 37 by means of a sprocket chain 47 and sprocket wheels 48 and 49. The car is provided with a seat 50 for the driver and a shift lever 51 near the seat. With the driving gear shown, all four wheels of the driving truck are driven.

The gear shifts are shown in Figs. 7, 10 and 11. The old part of the gear shift mechanism includes the brake clutch 52, forward speeds clutch, both low and high, 53, and reverse clutch 54. Provision is made for operating these clutches. A cable 55 is connected to the clutch 52 and to a foot pedal 56. A cable 57 is attached to the clutch 53 and to a lever 58 which is rigid with shaft 59. The clutch 54 is connected with a cable 60 which is connected to lever 61 which is rigid with a sleeve 62. A frame 63 is provided for the levers 51 and 58 and 61. The lever 51 is pivotally connected to a yoke 64 which is slidably mounted on the shaft 59. The frame 63 serves as a bearing for the shaft 59 and for the sleeve 62. A lever 65 is rigid with shaft 59. The lever 58 is actuated by means of the shift lever 51 acting through the lever 65 and shaft 59. A lever 66 is rigid with sleeve 62 and the lever 61 is actuated by the shift lever 51 acting through the lever 66, and sleeve 62. Figs. 10 and 11 show the shift lever 51 in neutral position. The frame 63 has a compartment 67 for the movement of the lever 51 to obtain low and high speeds. The frame 63 has a compartment 68 for the movement of the lever 51 to reverse. Springs 69 and 70 are attached respectively to levers 65 and 66 and tend to hold the lever 51 in neutral position. The lever 51 may be shoved to low or high or neutral position at will or to reverse at will. The operations of levers 58 and 61 operate the clutches 53 and 54.

What we claim, is,—

1. In combination with a truck bolster and a body bolster and a king bolt pivotally connecting the same; means for vertically adjusting said body bolster relative to the body framing comprising hanger elements mounting the ends of such bolster with adjusting means cooperating therebetween.

2. In a car provided with a frame and a body bolster therefor; a vertically adjustable connection between said body and frame comprising vertically disposed hangers connected to said frame members and forming pockets to receive the ends of said bolster, and spacing blocks in said pockets for adjusting said frame relative to said bolster.

In testimony whereof, we set our hands, this 13th day of May, 1927.

FRED M. McFALLS.
GEORGE H. BROWN.